United States Patent
O'Gorman et al.

(10) Patent No.: US 7,414,425 B2
(45) Date of Patent: Aug. 19, 2008

(54) DAMPING CONTROL IN A THREE-PHASE MOTOR WITH A SINGLE CURRENT SENSOR

(75) Inventors: Patrick A. O'Gorman, Grayslake, IL (US); Scott W. Repplinger, Lake Zurich, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 0 days.

(21) Appl. No.: 10/842,358

(22) Filed: May 10, 2004

(65) Prior Publication Data

US 2005/0248361 A1    Nov. 10, 2005

(51) Int. Cl.
*G01R 31/34* (2006.01)
*G05B 19/00* (2006.01)

(52) U.S. Cl. ............... 324/772; 324/545; 324/158.1; 702/64; 318/696

(58) Field of Classification Search ........... 324/127, 324/117 R, 117 H, 772, 142; 702/64; 318/71, 318/810, 811, 696
See application file for complete search history.

(56) References Cited

U.S. PATENT DOCUMENTS

| | | | |
|---|---|---|---|
| 4,422,040 A * | 12/1983 | Raider et al. ............... 324/772 |
| 5,274,317 A | 12/1993 | Utley et al. |
| 5,309,349 A | 5/1994 | Kwan |
| 5,436,545 A | 7/1995 | Bahr et al. |
| 5,874,818 A | 2/1999 | Schuurman |
| 5,909,098 A * | 6/1999 | Konecny et al. ............ 318/811 |
| 5,955,862 A | 9/1999 | Nguyen Phunoc |
| 5,969,958 A | 10/1999 | Nielsen et al. |
| 6,023,136 A | 2/2000 | Pinewski |
| 6,049,474 A | 4/2000 | Platnic |
| 6,075,338 A | 6/2000 | Mazza et al. |
| 6,185,115 B1 | 2/2001 | Sul et al. |
| 6,316,895 B1 | 11/2001 | Ramarathnam |
| 6,359,405 B1 * | 3/2002 | Tsurumi ................... 318/434 |

(Continued)

FOREIGN PATENT DOCUMENTS

DE    3614093    11/1987

(Continued)

OTHER PUBLICATIONS

Blaabjerg, Frede et al.: "Single Current Sensor Technique in the DC-link of Three-phase PWM-VS Inverters A Review and the Ultimate Solution", 0-7803-3544-9/9/96, 1996 $5.00 © IEEE, pp. 1192-1202.

(Continued)

*Primary Examiner*—Ha Nguyen
*Assistant Examiner*—Emily Y Chan

(57) ABSTRACT

While a PWM-controlled, FET-switched three-phase motor is operating in a mechanical damping mode, a single current sensor is used to measure current in the motor. When mechanical feedback into the motor exceeds a predetermined threshold, a bank of the FET switches can be closed to provide damping of the mechanical feedback. This causes currents to circulate within the motor, which an external single current sensor cannot measure to determine current load or when the mechanical feedback is no longer a problem. The present invention periodically switches selected switches necessary to sample the current in at least one phase of the motor to determine when the mechanical feedback into the motor is no longer a problem, while preferably also maintaining an average zero voltage vector.

21 Claims, 7 Drawing Sheets

U.S. PATENT DOCUMENTS

| | | |
|---|---|---|
| 6,452,349 B1 | 9/2002 | Hahn et al. |
| 6,456,946 B1 * | 9/2002 | O'Gorman .................. 702/58 |
| 6,529,393 B1 | 3/2003 | Yu |
| 6,593,751 B2 * | 7/2003 | Takahashi ................... 324/551 |
| 6,735,537 B2 * | 5/2004 | Liu et al. ...................... 702/64 |
| 6,882,549 B2 * | 4/2005 | Huggett et al. ................ 363/40 |
| 7,109,742 B2 * | 9/2006 | de Larminat et al. ........ 324/772 |

FOREIGN PATENT DOCUMENTS

| | | |
|---|---|---|
| EP | 0 502 226 B1 | 9/1995 |
| EP | 0 599 260 B1 | 8/1997 |
| EP | 1 083 650 A2 | 3/2001 |
| JP | 7-177793 | 7/1995 |
| JP | 9-9661 | 1/1997 |
| JP | 2000-324877 | 11/2000 |
| JP | 2002-95263 | 3/2002 |
| WO | WO 01/20343 A1 | 3/2001 |

OTHER PUBLICATIONS

Zhang, Chunpeng et al.: "A Single Current Sensor Control Technique for Induction Motors," 0-7803-7459-2/02/$17.00© 2002 IEEE, pp. 2290-2293.

Blaabjerg, F. et al.: An Idel PWM-VSI Inverter Using Only One Current Sensor in the DC-Link, Power Electronics and Variable-Speed Drives, Oct. 26-28, 1994, Conference Publication No. 399, © *IEE*, 1994, pp. 458464.

Blaabjerg et al., "Single Current Sensor Technique in the DC Link of Three-Phase PWM-VS Inverters: A Review and a Novel Solution", IEEE Transactions on Industry Applications, vol. 33, No. 5, pp. 1241-1253, Sep. 1997.

* cited by examiner

| S1, S2 | S3, S4 | S5, S6 | I_dc_link | VECTOR |
|---|---|---|---|---|
| S1=CLOSED S2=OPEN | S3=OPEN S4=CLOSED | S5=OPEN S6=CLOSED | Ia | V1 |
| S1=CLOSED S2=OPEN | S3=CLOSED S4=OPEN | S5=OPEN S6=CLOSED | -Ic | V2 |
| S1=OPEN S2=CLOSED | S3=CLOSED S4=OPEN | S5=OPEN S6=CLOSED | Ib | V3 |
| S1=OPEN S2=CLOSED | S3=CLOSED S4=OPEN | S5=CLOSED S6=OPEN | -Ia | V4 |
| S1=OPEN S2=CLOSED | S3=OPEN S4=CLOSED | S5=CLOSED S6=OPEN | Ic | V5 |
| S1=CLOSED S2=OPEN | S3=OPEN S4=CLOSED | S5=CLOSED S6=OPEN | -Ib | V6 |
| S1=CLOSED S2=OPEN | S3=CLOSED S4=OPEN | S5=CLOSED S6=OPEN | I_0 OFFSET | V0 |
| S1=OPEN S2=CLOSED | S3=OPEN S4=CLOSED | S5=OPEN S6=CLOSED | I_0 OFFSET | V7 |

*FIG. 3*

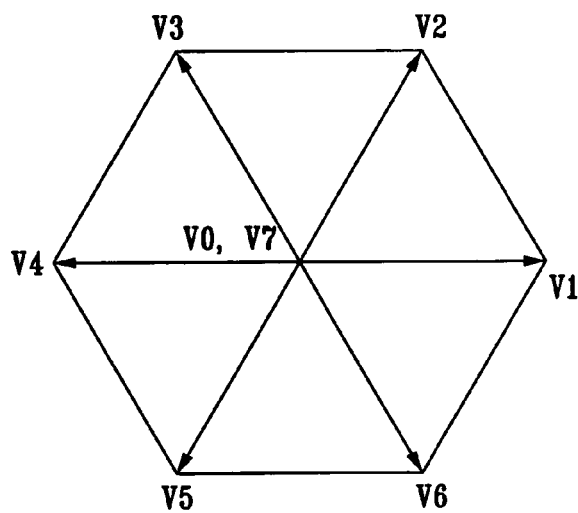

DAMPING CONTROL IN A THREE-PHASE MOTOR WITH A SINGLE CURRENT SENSOR

FIELD OF THE INVENTION

This invention in general relates to three-phase power devices (such as three-phase motors) and, more particularly, to an improved procedure for measuring the currents in each phase via a single current sensor for damping control and motor braking.

BACKGROUND OF THE INVENTION

A three-phase motor (such as a permanent magnet synchronous motor and induction motor) can be used in many applications to provide power assistance to mechanical systems. It is known to control the phase windings in a three-phase motor using pulse width modulated signals. The pulse width modulated signals are applied to an inverter or a series of switching devices that connect the phase windings of the motor to either a positive or negative terminal of a direct current (DC) power supply, such as a battery. This inverter consists of three switches in an upper bank and three switches in a lower bank.

To adequately control the motor, it is necessary to measure the current flowing through each phase winding. The current measured in each phase is provided to a controller that generates the pulse width modulated signals. To measure currents, it is known to use a resistor in series with each phase winding. The voltage drop across each resistor is measured to determine the current flowing for each phase. This type of system has the disadvantage of requiring three current sensors, one for each of the three phase windings, and three measurement circuits.

It is also known to eliminate at least one of the current sensors and calculate the current through the phase without a sensor based on the measurements of the other two phases. In most cases the sum of all currents flowing through all phases of the motor are zero, so by knowing the current flowing through two phases a determination of the current flowing through the phase without a sensor may be made (with the exception of star-connected motors with a grounded star point or a motor with a fault).

It is also known to use a single resistor to perform the function of measuring the current through each phase of the three-phase motor. The single resistor is located external to the motor windings on the DC link between the DC power supply and the inverter or series of switching devices. Depending on the states of the switches and period of operation, the currents through the phases may be measured or calculated by the single resistor.

It is also known to close either the upper bank of switching devices or the lower bank of switching devices, thereby connecting all phases of the windings of the motor together when damping or braking is required. Braking is used to damp unwanted mechanical system oscillations and is also used to reduce the speed of the mechanical system. For example, mechanical resonances or disturbances may feed back into the motor from the mechanical system. Not only are unstable mechanical resonances undesired by themselves, these resonances can generating an electromotive force (EMF) that can result in excess current in the motor. In damping mode, the closed switches allow current to circulate within the motor windings to act as a brake to oppose any motion induced by the mechanical resonances, thereby helping to restore stability. However, the internal circulation of currents within the motor windings in damping mode cannot be measured by a single external resistor since the resistor is not in a current carrying loop. Therefore, the currents within the motor windings cannot be measured, and therefore cannot be modified or controlled.

It is also known to modulate the three phase inverter switches to force the current in the motor to return to the battery for increased braking effort. In this case, the battery current flowing through the single resistor is in the opposite direction compared to normal motor operation. Consequently, the voltage developed across this resistor is negative and cannot be read by the controller unless the controller is designed for this case.

Therefore, a need exists for an improved technique to monitor current in a three-phase device, during damping/braking mode, using a single current sensor. It would also be desirable to provide this technique with no additional hardware requirements, thereby improving reliability and saving cost.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

FIG. 3 is a table reflecting the eight possible switching states of the switches of FIG. 1;

FIG. 4 is a voltage space vector diagram of FIG. 3;

Figure 1:
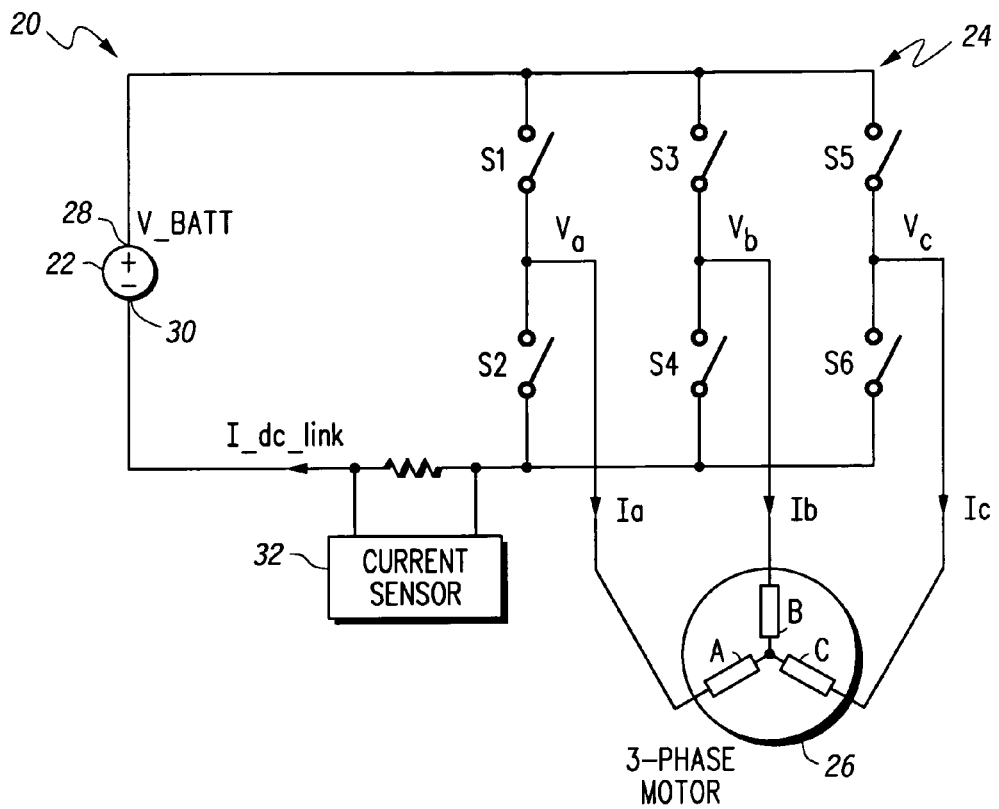
FIG. 1 is a diagram of a system having a power source, an inverter or switching circuit, and a three-phase motor, in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the broad scope of the invention as defined by the appended claims.

DETAILED DESCRIPTION OF THE PREFERRED EMBODIMENTS

What is described is an improved procedure for measuring the electric current flowing through each phase of a three-phase device in a system, during damping mode, using a single external current sensor. Advantageously, no additional hardware is needed to implement the invention. Three-phase motors, such as permanent magnet synchronous motors, may be used as part of a powered mechanical system. The present invention, however, is not limited to three-phase motors and may be applicable to other three-phase devices or even multi-phase devices.

It is possible for the powered mechanical systems to exhibit a lightly-damped resonant response within a specific frequency region (e.g. 5-10 Hz) due to the mechanical properties of the system and the closed loop response of the controller. However, it is desirable that the closed-loop control system remain stable for all possible mechanical disturbances. If a mechanical disturbance is encountered which is in the frequency range where a lightly damped system response occurs, the controller operation must be modified such that system stability is maintained. The system response is defined as the closed loop response of the mechanical system and the electronic controller. One way to ensure system stability is to short the motor windings. This action has the consequence of damping the motor and mechanical system response because the motor acts as a brake to oppose any motion induced by the mechanical system.

Now, turning to the drawings, an example use of a system for a three-phase device in accordance with the present invention will be explained. Referring to FIG. 1, there is a system 20 having generally a power source 22, an inverter or switching circuit 24, and a motor 26. Typically, the power source 22 is a DC battery having a positive terminal 28 and a negative terminal 30. The negative terminal 30 may also be a ground connection. The motor 26 may be a motor having three phase windings A, B, C in a Y-connection, although other connection types may be used such as a delta-connected motor. Such motors may include, for example, a permanent magnet synchronous motor or an induction motor.

The inverter or switching circuit 24 includes three sets of switching devices, one set for each phase winding of the motor 26. A first set of switching devices S 1, S2 are capable of providing a first voltage $V_a$ to the first phase winding A. A second set of switching devices S3, S4 are capable of providing a second voltage $V_b$ to the second phase winding B. A third set of switching devices S5, S6 are capable of providing a third voltage $V_c$ to the third phase winding C.

A variety of switching devices S1-S6 may be used for the switching circuit 24. For example, the switching devices S1-S6 may be power transistors such as IGBT, power MOSFET, and bipolar transistors, as are known in the art. The PWM signals would then be applied to the gates or bases of the power transistors. What is important is that each switching device S1-S6 is capable of being opened or closed (or turned off or on) by applying a PWM signal.

Each set of switching devices has an upper switching bank S1, S3, S5 connected to the positive terminal 28 of the power source 22 and a lower switching bank S2, S4, S6 connected to the negative terminal 30 of the power source 22 (or ground). Each switching device within a bank is complimentary to the other switch within the other bank. For example, when the upper switching device, S1, of the upper bank of switching devices is closed, the corresponding lower switching device, S2, within the lower bank of switching devices is open. Similarly, when the upper switching device, S1, of the upper bank of switching devices is open, the corresponding lower switching device, S2, within the lower bank of switching devices is closed.

By having complementary switching devices, the opening and closing of switching devices within each set (i.e. phase leg of the inverter) allows each phase winding A, B, C of the motor 26 to be connected to a positive terminal 28 or a negative terminal 30 of the power supply 22. This permits a voltage $V_a$, $V_b$, or $V_c$ to be applied to a corresponding phase winding A, B, or C of the motor 26, respectively. The current flowing through each phase winding A, B, or C is represented in FIG. 1 by a corresponding variable Ia, Ib, or Ic, respectively.

Figure 2:
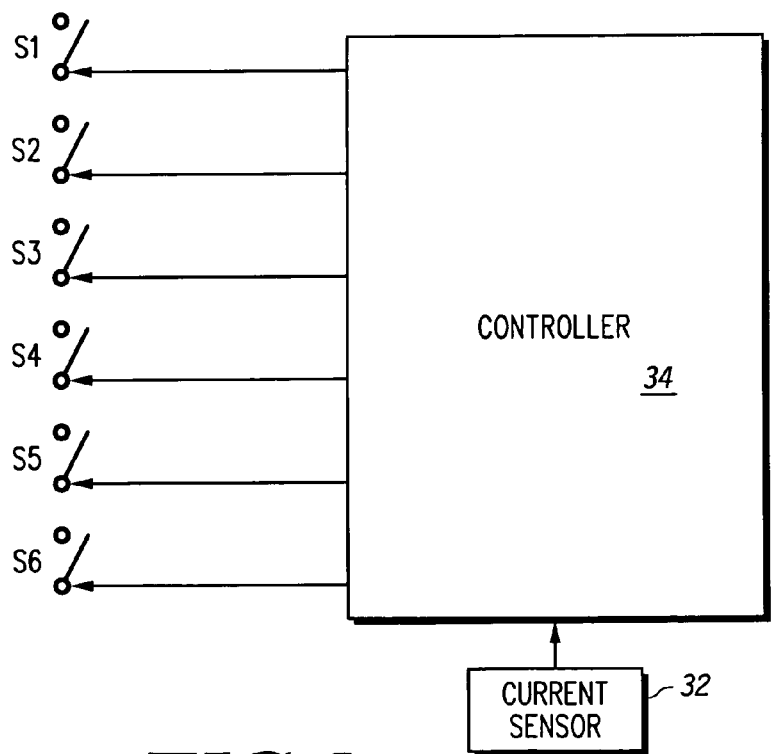
FIG. 2 is a diagram of a controller for the system in FIG. 1 for generating PWM signals to a plurality of switching devices.

As will be explained in more detail below, the present invention uses a plurality of pulse width modulated (PWM) signals to control the upper and lower bank of switching devices S1-S6. Referring to FIG. 2, a controller 34 is used to generate a PWM signal to each of the switching devices S1-S6. The controller 34 is coupled to the switches to provide the pulse width modulation signals for controlling the switches. The controller 34 is operable to generates the PWM signal based on a received current measurement signal provided by a current sensor 32 coupled to the controller 34. It should be recognized that the current sensor 32 can be associated with comparators, analog-to-digital converters, and the like in order to provide an analog or digital signal to the controller indicating a current in the measured phase of the motor 26. In addition, the controller 34 can include a digital processor and memory to store software having control algorithms. The digital processor supplies the PWM signals based the control algorithms implemented in software, in accordance with the present invention. A suitable controller 34 having a digital processor for the present invention may be obtained from Texas Instruments Incorporated as part number TMS320LF2406, for example. The part is a digital signal processor (DSP) controller that includes flash memory to store software. Alternatively, the controller 34 could include a DSP processor with an external memory (not shown).

In operation, the current sensor 32 is operable to measure current in at least one phase, and preferably each phase of the motor, sequentially. The controller 34 is operable to input the signal from the current sensor 32 to determine when the current exceeds a predetermined threshold due to mechanical feedback from the motor. The predetermined threshold can include not only a limit for a current value, but also a number of times that the current value exceeds the limit in a certain time before entering damping (zero vector) mode. If the predetermined threshold is exceeded within the predetermined time the controller closes all of the switches of one of the upper and lower bank of switches to provide damping of the mechanical feedback, while leaving the bank of other switches open. It will be evident to those skilled in the art that the upper bank of switches can be closed for a certain time, at which point the upper bank is opened and the lower bank of switches is closed (i.e. rotating the opening) in order to distribute the heat between the two switch banks. It may also be determined that a more aggressive level of damping/braking is needed, in which case the current is returned to the battery, instead of circulating within the motor.

A novel aspect of the present invention occurs during damping mode, wherein the controller 34 is operable to periodically switch selected switches necessary for the current sensor 32 and controller 34 to determine the current in at least one phase of the motor, whereupon the sensor and controller sample the current of the phase selected. This is repeated for short sampling periods until the sampled current indicates that the mechanical feedback into the motor has fallen below the predetermined threshold, whereupon the apparatus exits the damping mode, leaving the PWM system to operate normally.

In a preferred embodiment, the controller 34 is operable to select the switches to sample the current such that an average vector voltage of the motor is substantially zero. In practice, the controller is operable to select the switches to sample the current such that positive and negative voltage vectors of each phase of the motor are sampled wherein an average vector voltage of the motor is substantially zero. For example, the current Ia could be sampled in one PWM cycle followed by a sample of current −Ia in a subsequent PWM cycle, resulting in a zero (i.e. Ia−Ia=0) voltage vector. Preferable, six samples are taken for a positive, and negative current for each phase (i.e. Ia, −Ia, Ib, −Ib, Ic, −Ic) resulting in a zero voltage vector.

Switching out of the upper or lower bank-activated mode occurs in damping mode only long enough to obtain an accurate sample, after which the switches are returned to their previous state. During this time, the current no longer circulates within the motor windings but flows from the battery through the sense resistor, thereby permitting a phase current reading to be obtained. During the following cycle, the complementary switches are activated to determine the equivalent negative phase current (e.g. first sample is for +Ia, second sample for −Ia) In other words, the controller is operable to unswitch all the switches that were switched in order to obtain a current sample directly after a current sample has been obtained. Problems may occur when using PWM signals if the time periods for sampling the current are very small or nonexistent. When the time periods for sampling are very small or nonexistent, the system is not able to measure the currents through the phases of the windings in the motor.

Accordingly, the present invention takes into account the different cases of damping modes where the currents through at least one phase of the windings in a motor are measured or sampled. As explained in more detail below, depending on the specific case, the PWM signals are provided to allow a sufficient sampling window (or time period) for measuring a current across the sense resistor on the DC link. Typically, a 5 µs sampling window is adequate.

Optionally, the controller is operable to open all of the switches until the next PWM cycle such that the switches act as rectifiers dumping current back to a power source while maintaining a damping effect on the mechanical system. In this case the maximum amount of motor braking is occuring. This option can be useful under certain current conditions, as will be explained below. Current dumping is best accomplished when the switches are field effect transistors since open FETs act as diode rectifiers.

Preferably, the controller is operable to switch the switches earlier within a PWM period as long as the motor is in damping mode. This provides an amount of current dumping control as will be explained below. As long as the current measurements indicate that the motor still requires damping, the current samples can be taken earlier and earlier in the PWM cycle. Since a preferred technique of operation is to take six current measurements, a positive and negative current for each phase, before exiting damping mode (in order to maintain a zero voltage vector condition), it may be that one of the earlier current measurements indicates that damping mode is no longer needed. In this case subsequent current measurements of the remaining six samples can be taken later and later in the PWM cycle, since current dumping is no longer required. In other words, the controller is operable to switch the switches for each positive and negative voltage vector for each phase of the motor before exiting the damping mode, and wherein the controller is operable to switch the switches earlier within a PWM period as long as the motor is in damping mode and later within a PWM period as the mechanical feedback into the motor falls below the predetermined threshold. By altering the proportion of motor damping with three switches closed to the proportion of current dumping with all six switches open, the amount of overall motor braking is controlled to achieve the desired mechanical damping.

Normally, current dumping can be monitored using a single input for the current sensor. Optionally, current dumping can be performed wherein battery current flows through the single sense resistor in the opposite direction compared to normal motor operation. In addition, a differential current sensor could be used to sense currents in either direction through the sense resistor. However, it should be recognized that this would add cost.

Referring back to FIG. 1, to adequately control the motor 26, the currents Ia, Ib, Ic need to be measured or otherwise known. In one embodiment, the single current sensing device 32 is positioned on the DC link between the power supply 22 and the switching circuit 24. In particular, the current sensing device 32 is located between the lower switching devices S2, S4, S6 of the switching circuit 24 and the negative terminal 30 (or ground) of the power supply 22. Alternatively, the current sensing device 32 can located between the upper switching devices S1, S3, S5 of the switching circuit 24 and the positive terminal 28 of the power supply 22. The current sensing device 32 can be a sensor that measures the voltage drop across a resistor, for example. The current sensing device 32 is capable of converting the measured voltage drop to a value representing the current (represented by I_dc_link) through the DC link according to well-known devices and techniques.

As explained above, each switching device within a set (i.e. leg) of switching devices is complementary to the other switching device. For a three-phase motor system, this results in eight possible switching states. The table illustrated in FIG. 3 reflects the eight possible switching states as vectors V0-V7. The first column 40 in the table represents the states (open/closed) of the first set of switching devices S1, S2. The second column 42 in the table represents the states (open/closed) of the second set of switching devices S3, S4. The third column 44 in the table represents the states (open/closed) of the third set of switching devices S5, S6. The fourth column 46 reflects the relationship between the current through the DC link (I_dc_link) and the currents Ia, Ib, and Ic through the various phase windings A, B, and C. The fifth column 48 reflects the eight vector states. Out of the eight possible switching states, there are six active vector states (V1-V6) where current will flow through the DC link and two zero vector states (V0, V7) corresponding to damping modes for the motor where damping current circulates within the motor winding and no current will flow through the DC link.

The present invention uses PWM signals to control the states of the switching devices S1-S6. By controlling the states of the switching devices S1-S6, desired phase voltages may be applied to the phase windings A, B, C of the motor 26.

FIG. 4 shows a typical inverter voltage space vector diagram for PWM operation. The voltage vectors result from the various switching arrangements of FIG. 3. The configuration of the six FETs permits a total combination of eight vectors to be applied to the motor (in each leg of the inverter, one of the FETs is always on). Two of these vectors V0, V7 are called 'zero voltage vectors' because either the lower three FETs are all on or the upper three FETs are all on, while the other bank of switches is entirely open, and zero voltage is effectively applied to the motor during damping mode. The other six vectors V1-V6 are of secondary importance here as they involve one upper and two lower FETs on or two upper and one lower FET on as is done during normal, non-damped operation.

Figure 5:
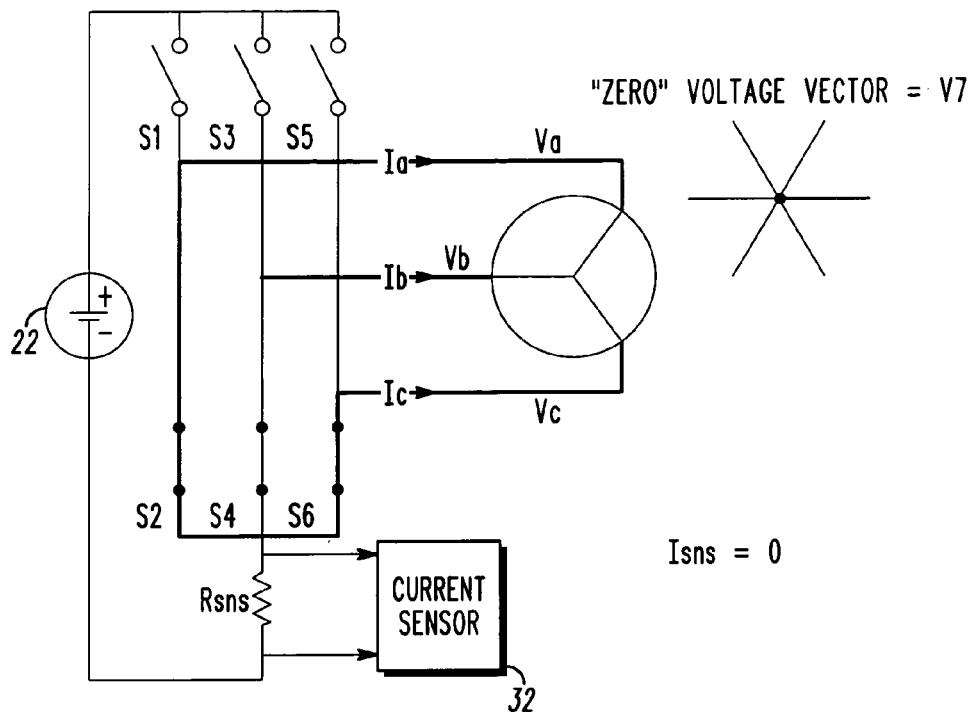
FIG. 5 is a schematic diagram of a switching configuration for damping mode, in accordance with the present invention.

FIG. 5 demonstrates the motor circuit when switched with vector V7, having all the lower switches S2, S4, S6 closed and all the upper switches S1, S3, S5 open. In normal, non-damped operation the lower three FETs (or upper three FETs) are not shorted and the current in the sense resistor may be observed for control and monitoring purposes. When the lower three FETs are shorted, the current flowing in the motor/FET combination cannot be observed under ordinary circumstances, and the amount of system damping applied cannot be modified or controlled. This technique effectively shorts the motor terminals and current is limited only by circuit impedance and motor speed. In this case, current does not flow through the sense resistor (Isns=0) and consequently FET current is unknown.

This present invention allows the motor current in each phase to be observed with minimal effect on the application of the zero voltage vector. Advantageously, this allows greater control over the amount of damping applied to the system and prevents an overcurrent situation in one of the lower FETs when current does not flow through the sense resistor.

Figure 6:
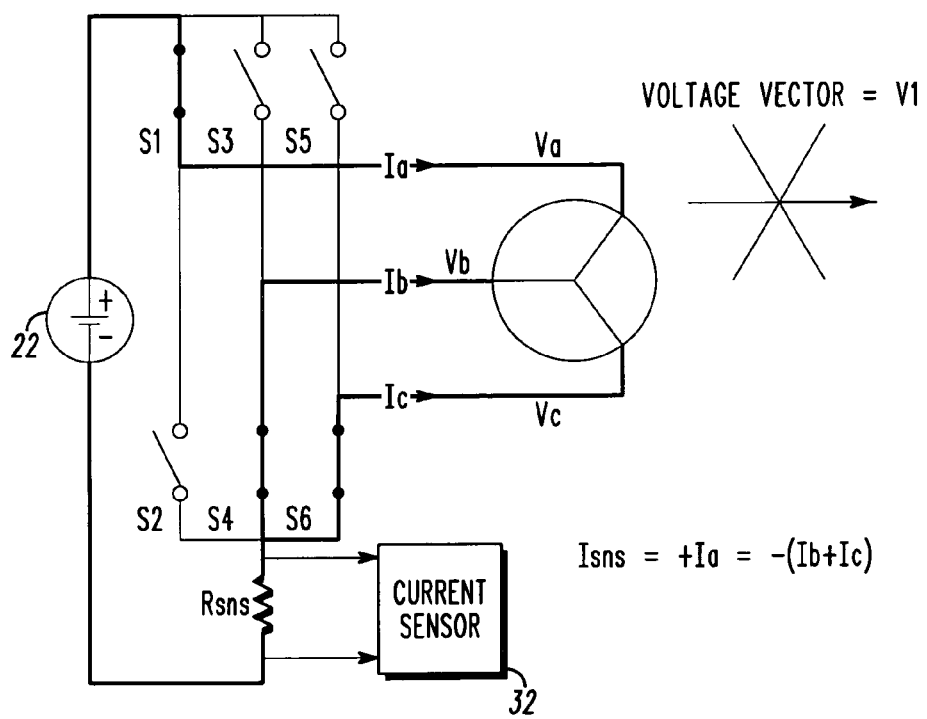
FIG. 6 is a schematic diagram of an example of a switching configuration to measure a current during damping mode, in accordance with the present invention.

In practice, during application of the zero voltage vector to provide damping, the controller modifies the zero voltage vector during the PWM period in order to obtain sampled measurements of each of the motor phase currents. The FETs are switched just long enough to obtain a sample of the current in at least one winding of the motor. As shown in the example of FIG. 6, the S1, S4 and S6 FETs are switched on (closed) to allow the current sensor 32 time to sample of the current, Ia, in one phase of the motor windings. However, this one sample unbalances the zero voltage vector. Therefore, during the next PWM cycle it is desired to switch the FETs (using the table of FIG. 3) to measure the −Ia current and thereby restore an average zero voltage vector over time. It is preferred to perform positive and negative vector measurements for all phases of the motor in order to obtain the most accurate picture of all the currents in the motor while maintaining an average zero voltage vector.

Figure 7:
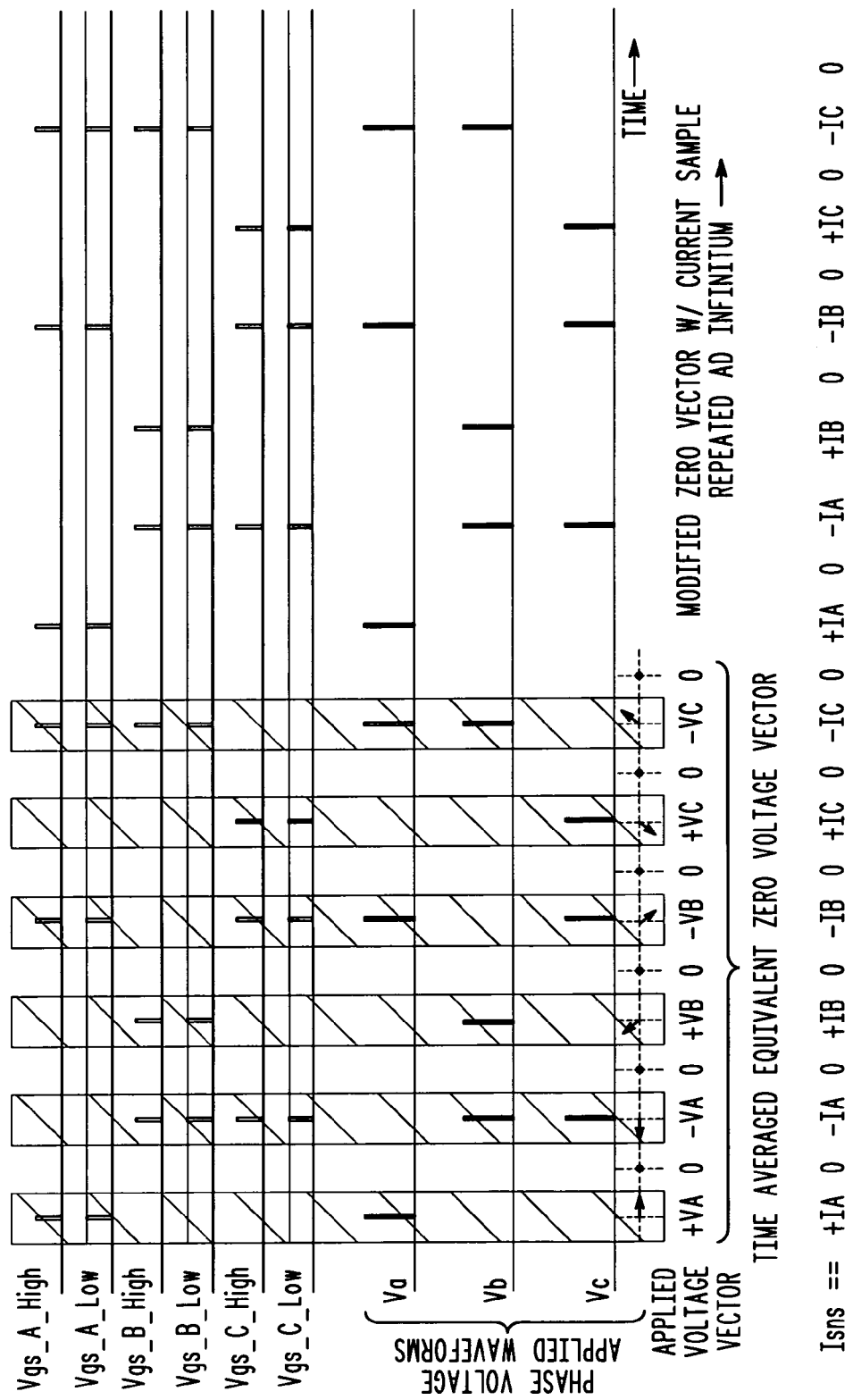
FIG. 7 is a diagram of the switching operation and the timing of the switches to measure currents during damping mode, in accordance with the present invention.

FIG. 7 shows a detailed graph of how the PWM pulses are modified to enable phase currents to be sampled. PWM signals (Vgs_n) are applied to the gates of the associated FETs. In this figure, a high pulse indicates that the corresponding FET in the upper bank is turned on (closed) and a low pulse indicates that the FET is turned off (open); the FETs in the lower bank operate such that a low pulse turns the FET on while a high pulse turns the device off. The first PWM cycle shown represents the case of FIG. 6.

During each PWM cycle one or more non-zero vectors are selected, such that the motor current is driven through the bus current shunt resistor, Rsns. This current is then sampled by reading the voltage developed across Rsns. Many techniques are know for sampling, amplifying and measuring current and will not be presented. The non-zero voltage vectors are applied only long enough to allow sensing of the motor current(s). Preferably, all non-zero vectors are sequenced through in order to maintain a time-averaged equivalent of the desired zero vector.

The sampled currents are compared against a predetermined current threshold. Exceeding the current threshold can indicate that damping is needed, not only to stabilize the mechanical system but to also avoid damage in the circuit due to the high current. In practice, one excessive current indication may not be enough to trigger damping mode. Instead, a counter used to count the number of sequential excessive current samples taken in a certain time, wherein if the excessive current condition persists over a significant grouping of PWM cycles, then damping mode is entered, wherein one bank of FETs are closed, and the other opened, as described previously.

Figure 8:
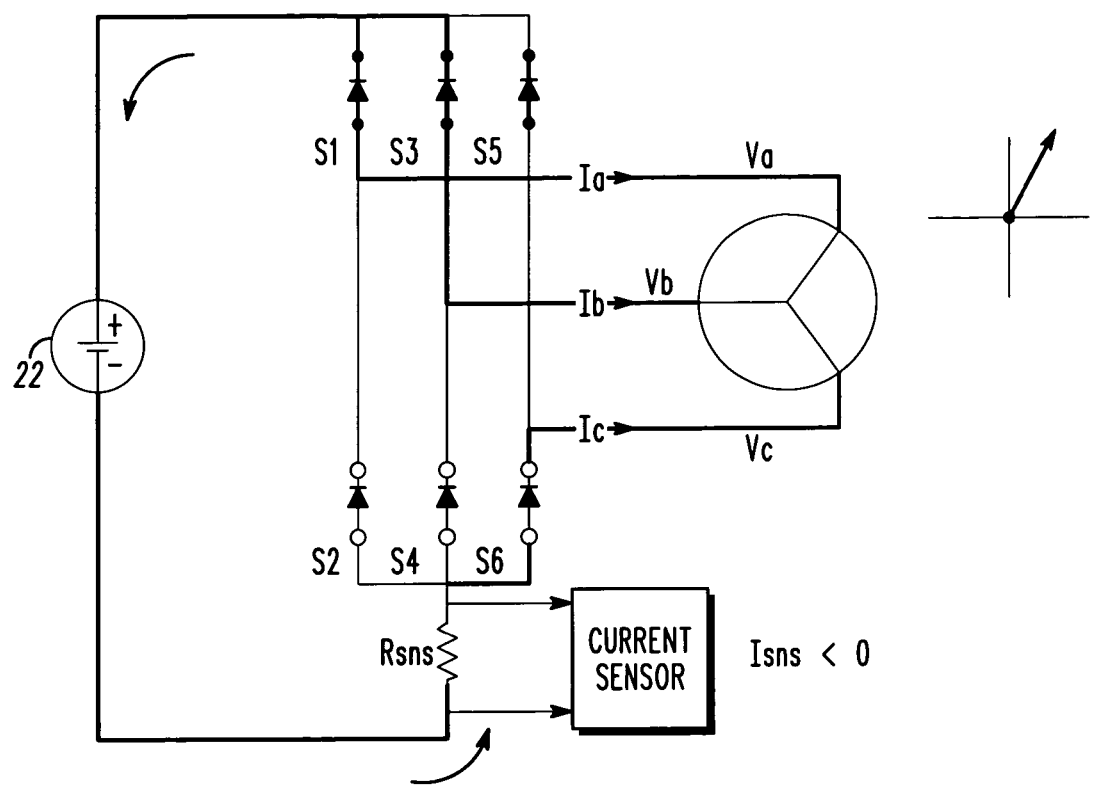
FIG. 8 is a schematic diagram of a switching configuration for current dumping in damping mode, in accordance with the present invention.

Optionally, the present invention can monitor the currents against an overcurrent threshold, wherein the possibility exist for damage to the motor or circuit. Where an overcurrent is detected, the present invention provides for a rectifier mode that is imposed upon the damping mode, wherein currents are dumped back to the battery, as shown in FIG. 8. In this case the present invention disables (opens) all of the FETs and thereby forces the three-phase bridge to behave as an uncontrolled rectifier (motor currents circulating through the body diodes of the FETs and return to the battery) for the remainder of the PWM cycle, after which damping mode continues. This function can be implemented in hardware as a peak current limit. During the uncontrolled rectifier mode, the system is unconditionally guaranteed to transfer energy from the motor back to the power system/battery.

Figure 9:
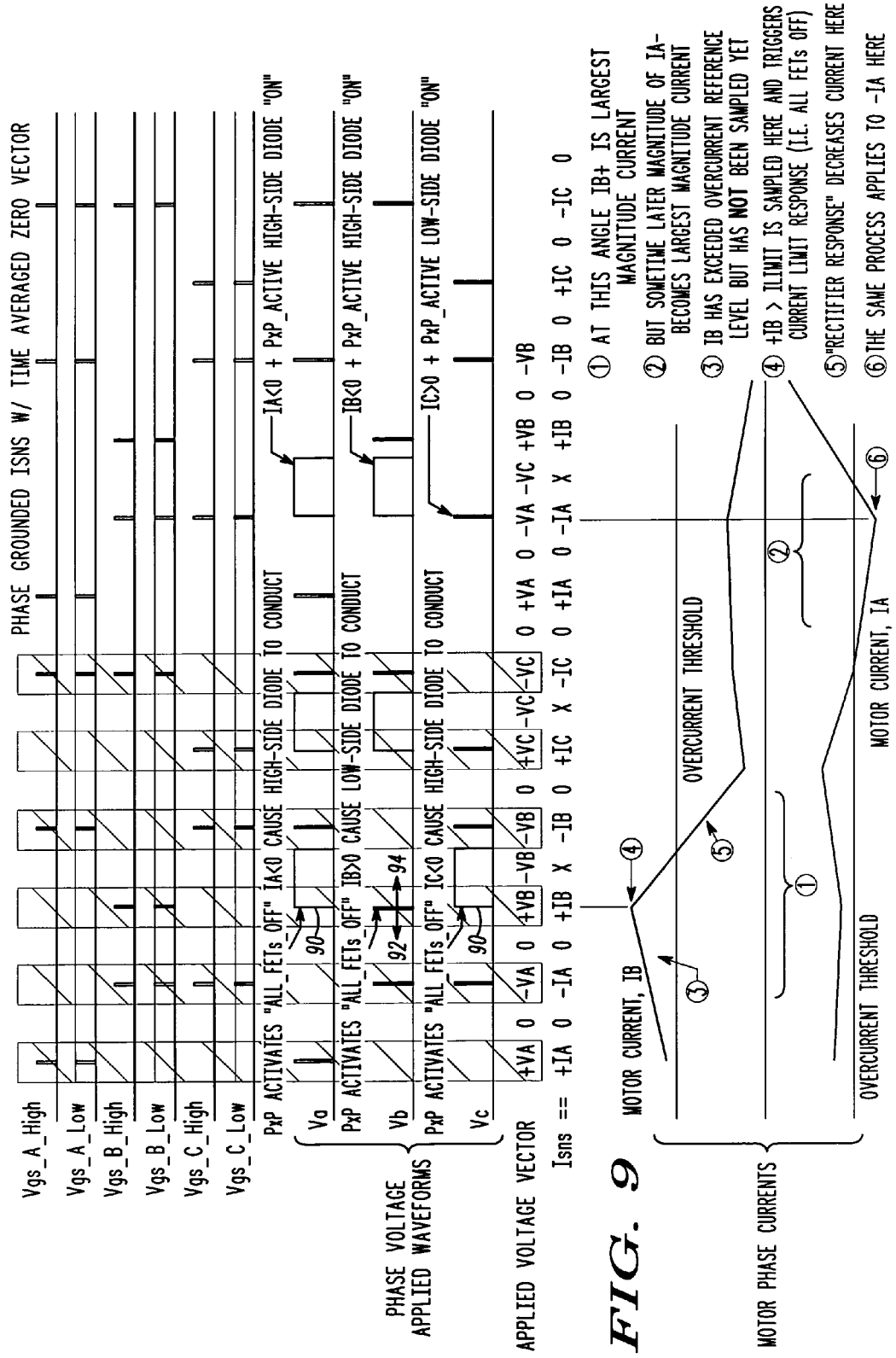
FIG. 9 is a diagram of the switching and timing of the switches to measure current and provide current dumping during damping mode, in accordance with the present invention.

The system response over multiple damping mode cycles is shown in FIG. 9, where the P×P_ILimit threshold forces the power stage into the rectifier mode of FIG. 8. In this way, energy is transferred from the mechanical system to the battery system. In the example shown, an overcurrent is detected first in the Phase B current during the A−B+C− switch configuration, and again some time later in the Phase A current during during the A−B+C+ switch configuration. Each time after the overcurrent condition is detected, all the FETs are gated Off for the remainder of that PWM cycle, resulting rectification and current flow back to the battery via the body diodes of the FETs. During this rectifier mode, the motor current decays below the P×P_ILimit threshold and thus remains within the design limits of the hardware (i.e. FETs). After the PWM cycle expires, the subsequent cycle repeats the damping mode sequence, and this behavior continues until the mechanical feedback to the system is stabilized allowing an exit from the damping mode.

During rectifier mode, the energy transferred back to the battery is greater than the energy dissipated in the FETs and motor when the zero voltage vector is applied. The amount of damping provided in the rectifier mode is greater than the damping provided in zero vector (damping) mode. The present invention controls the amount of system damping by controlling the time spent in the rectifier mode and the time spent in zero vector mode. The amount of time that all FETs are off determines how much energy is returned to the battery. This recovery of energy to the battery system is more efficient and reduces total power dissipation in both the controller and system, which would otherwise result. In particular, after the rectifier mode has been activated, the current sampling pattern is modified from the zero vector mode sequence to a scheme where system damping is maximized while operation within the peak current capability of the hardware design is maintained.

In a preferred embodiment, the present invention moves the timing location of the damping-mode current sensing pulses within a PWM period so that the current in the FETs does not rise by ever increasing amounts. Initially, the current sensing pulses are located at the end of the PWM period. When an overcurrent event occurs, the location of the current sensing pulses is moved earlier 92 in the PWM pulse and if an overcurrent event occurs again, the current is returned to the battery for a longer time 90. If no overcurrent event occurs subsequently, a relaxation algorithm will move the current sensing pulses back 94 to the end of the PWM period.

In summary, the present invention applies maximum damping to the system by driving an optimized zero voltage vector through the 3-phase bridge of the power stage and selecting a non-zero vector only to sense current as required. Due to the inherent nature of the motor/FET switching configuration, the rectifier mode automatically selects the appropriate voltage vector to return energy to the power source/battery and reduce motor current to an acceptable level. During this operation, maximum damping is applied to the motor by the drive since the motor currents are maintained at the maximum current capability according to P×P_ILimit.

In the prior art, current cannot be sensed using a single external resistor when the motor windings are shorted. The only solution was to periodically leave zero vector mode after a random time and enter normal operation to see what current are present. This potentially exposes a motor circuit to damaging currents because the motor current is not monitored during damping mode and normal operation is enforced for a full switching cycle. The present invention provides an improvement wherein non-zero voltage vectors are sequenced such that: a) a time-averaged equivalent remains a zero-vector and all motor currents are sampled sufficiently fast to limit peak motor/FET currents and thereby protect the system; b) the system response to overcurrent detection is to momentarily gate all FETs "OFF" and allow the body diodes to recirculate current (energy) to the power source/battery thus ensuring a reduction in motor current; and c) no calculations or compensation related to motor velocity are required.

In another embodiment, the present invention provides a method for measuring the current in each phase of a three-phase motor 26 by the sensor 32, the motor 26 being controlled by a plurality of switching devices S1-S6 that receive pulse width modulation signals from the controller 34. The method includes the monitoring of the modulation index for the pulse width modulation signals during a pulse width modulation cycle.

Figure 10:
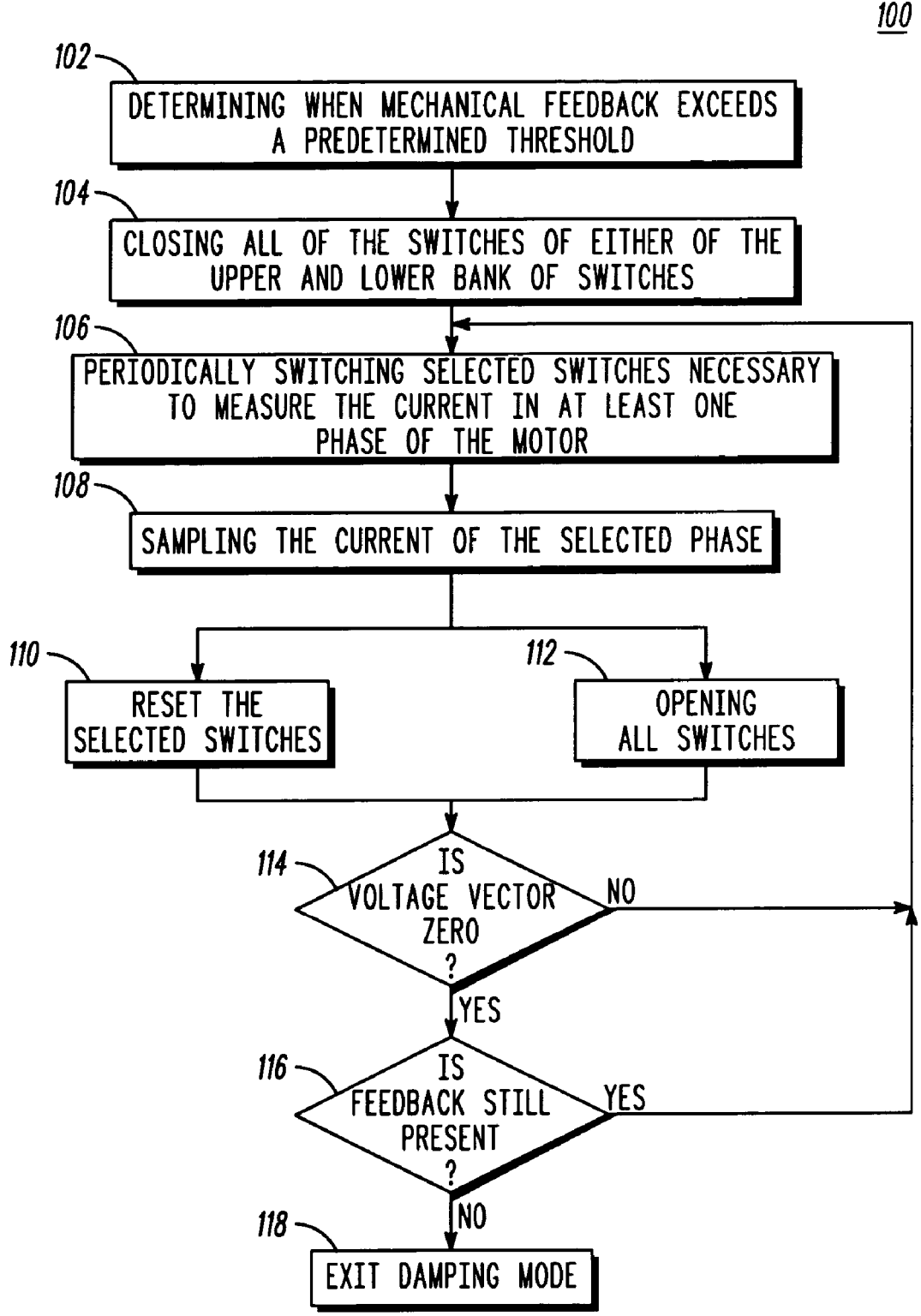
FIG. 10 is a flow chart for measuring current of a three-phase motor during damping mode, in accordance with the present invention.

FIG. 10 illustrates a method 100 for measuring current by a sensor in a three-phase motor operating in a damping mode. The drive current to the three-phase motor is switched by an upper bank of switches and a lower bank of switches controlled by a plurality of pulse width modulation signals.

A first step 102 of the method includes determining when mechanical feedback into the motor exceeds a predetermined threshold, indicating that the damping mode should be entered.

A next step 104 includes closing all of the switches of either of the upper and lower bank of switches to provide damping of the mechanical feedback. The other bank of switches is switched open. This scenario recirculates the current within the motor windings to provide maximum damping.

A next step 106 includes periodically switching selected switches necessary to measure the current in at least one phase of the motor.

A next step 108 includes sampling the current of the phase selected in the switching step by the sensor.

The switching and sampling steps 106, 108 are repeated until the sampled current indicates that the mechanical feedback into the motor has fallen below the predetermined threshold 116. Once this happens the damping mode can be exited 118. Preferably, the selected switches in the switching step 106 are chosen in repeated steps such that an average vector voltage of the motor is substantially zero 114. This can be done by choosing the selected switches in the switching step 106 such that positive and negative vector voltages of one phase, and preferably all the phases, of the motor are sampled in sequence in the subsequent sampling steps 108 wherein an average vector voltage of the motor is substantially zero.

In a preferred embodiment, after the sampling step 108, a further step 110 is included that resets the switches to their previous states before the switching step 106 directly after the sampling step 108 has obtained a current sample. This returns the motor to full damping mode. Optionally, where the switches are field effect transistors or other transistors with an external diode, a further step 112 is included that opens all of the switches until the next switching step 106 such that the switches act as rectifiers dumping current back to a power source and imposing a maximum damping torque to the motor. More preferably, the switching step 106 occurs earlier within a PWM period as long as the motor is in rectifier mode. This provides more current dumping as described previously. If the overcurrent is under control, then the switching step 106 occurs later within a PWM period. In this way, the amount of damping applied by the currents to the mechanical system is controlled and can be used to follow a profile if required by the needs of the mechanical system.

During damping mode, even though feedback is no longer a problem (step 116), damping mode will not be immediately exited 118 until the necessary positive and negative voltage vector samples are completed, in order to maintain a zero voltage vector (step 114). In other words, the switching 106 and sampling 108 steps are repeated for each positive and negative voltage vector for each phase of the motor before exiting the damping mode 118, which maintains an average zero voltage vector 114.

As described earlier, the pulse width modulation scheme described herein may include individual control loop periods, each having a plurality of pulse width modulation cycles (e.g. six cycles). The monitoring of the sampling windows or time periods may take place during one control loop period and the modifications to the natural PWM (to ensure proper current measurements) may take place in the next control loop period.

What has been described is an improved procedure for measuring current flowing in a three-phase device during damping mode. The above-described procedure modifies existing PWM operation based on specific cases. The procedure involves monitoring currents in a motor phase over very short periods and symmetrically to provide a net zero voltage vector. Additionally, the natural diode action of open FET switches can be used to dump current back to the power source while still providing damping action. It should be recognized that switching devices other than FETs can be used. However, in that case, external diodes are added to replicate FET body diodes so that the operation of the present inventions is the same as that with FETs.

Some of the advantages of the improved procedure include: (1) knowing when damping is no longer needed; (2) determining if peak currents during damping are too high; (3) providing a current dumping mechanism while maintaining damping; and (4) using existing hardware.

The above description of the present invention is intended to be exemplary only and is not intended to limit the scope of any patent issuing from this application. For example, the present discussion used a three-phase motor. The present invention is also applicable to other three-phase or multi-phase devices where pulse width modulation is used. The present invention is intended to be limited only by the broad scope of the following claims.

What is claimed is:

1. A method for measuring current by a sensor in a three-phase motor operating in a damping mode, drive current to the three-phase motor switched by an upper bank of switches and a lower bank of switches controlled by a plurality of pulse width modulation signals, the method comprising the steps of:

determining when mechanical feedback into the motor exceeds a predetermined threshold;
closing all of the switches of one of the upper and lower bank of switches to provide damping of the mechanical feedback;
after the closing step, periodically switching selected switches necessary to measure the current in at least one phase of the motor;
sampling the current of the phase selected in the switching step by the sensor;
repeating the switching and sampling steps until the sampled current in the sampling step indicates that the mechanical feedback into the motor has fallen below the predetermined threshold; and
exiting the damping mode.

2. The method of claim 1, wherein the selected switches in the switching step are chosen in repeated steps such that an average vector voltage of the motor is substantially zero.

3. The method of claim 1, wherein the selected switches in the switching step are chosen in repeated steps such that positive and negative vector voltages of one phase of the motor are sampled in the subsequent sampling steps wherein an average vector voltage of the motor is substantially zero.

4. The method of claim 1, wherein the selected switches in the switching step are chosen in repeated steps such that positive and negative vector voltages of each phase of the motor are sampled in the subsequent sampling steps wherein an average vector voltage of the motor is substantially zero.

5. The method of claim 1, wherein after the sampling step, further comprising a step of resetting the switches to their previous states before the switching step directly after the sampling step has obtained a current sample.

6. The method of claim 1, wherein after the sampling step further comprising the step of opening all of the switches until the next switching step such that the switches act as rectifiers dumping current back to a power source while maintaining damping current.

7. The method of claim 6, wherein the opening step includes rotating the opening of either of the upper and lower bank of switches in order to distribute the heat between the two switch banks.

8. The method of claim 1, wherein the switching step occurs earlier within a PWM period during an overcurrent condition.

9. The method of claim 1, wherein the switching and sampling steps are repeated for each positive and negative voltage vector for each phase of the motor before exiting the damping mode, and wherein the switching step occurs earlier within a PWM period during an overcurrent condition and occurs later within a PWM period after an overcurrent condition.

10. A method for measuring current by a sensor in a three-phase motor operating in a damping mode, drive current to the three-phase motor switched by an upper bank of switches and a lower bank of switches controlled by a plurality of pulse width modulation signals, the method comprising the steps of:

determining when mechanical feedback into the motor exceeds a predetermined threshold;
closing all of the switches of one of the upper and lower bank of switches to provide damping of the mechanical feedback;
after the closing step, switching selected first switches necessary to measure a first current in at least one phase winding of the motor at a positive voltage vector;
sampling the first current by the sensor;
further switching selected second switches necessary to measure a second current in the at least one phase winding of the motor at a negative voltage vector;
sampling the second current by the sensor;
repeating the switching and sampling steps such that an average vector voltage of the motor is substantially zero and until the sampled current in the sampling step indicates that the mechanical feedback into the motor has fallen below the predetermined threshold; and
exiting the damping mode.

11. The method of claim 10, wherein after each sampling step, further comprising respective steps of resetting the switches to their previous states before the switching step directly after the sampling step has obtained a current sample.

12. The method of claim 10, wherein the switches are field effect transistors, and wherein after the sampling step further comprising the step of opening all the switches until the next switching step such that the switches act as rectifiers dumping current back to a power source while maintaining damping current.

13. The method of claim 10, wherein after each repeating step the switching step occurs earlier within a PWM period during an overcurrent condition.

14. The method of claim 10, wherein the switching and sampling steps are repeated for each phase of the motor before exiting the damping mode, and wherein after each repeating step the switching step occurs earlier within a PWM period during an overcurrent condition and occurs later within a PWM period after an overcurrent condition.

15. An apparatus for measuring current by a sensor in a three-phase motor operating in a damping mode, the apparatus comprising:

an upper bank of switches and a lower bank of switches controlled by a plurality of pulse width modulation signals; and
a controller coupled to the switches to provide the pulse width modulation signals for controlling the switches, the controller operable to receive a current measurement signal from the sensor,
the sensor operable to measure current in each phase of the motor, the controller operable to input the signal from the sensor to determine when mechanical feedback into the motor exceeds a predetermined threshold, whereupon the controller closes all of the switches of one of the upper and lower bank of switches to provide damping of the mechanical feedback, and
wherein after the controller closes all of the switches of one of the upper and lower bank of switches to provide damping of the mechanical feedback, the controller operates to periodically switch selected switches necessary for the sensor and controller to measure the current in at least one phase of the motor, whereupon the sensor and controller sample the current of the phase selected and repeat the switching and sampling until the sampled current indicates that the mechanical feedback into the motor has fallen below the predetermined threshold, whereupon the apparatus exits the damping mode.

16. The apparatus of claim 15, wherein the controller is operable to select the switches to sample the current such that an average vector voltage of the motor is substantially zero.

17. The apparatus of claim 15, wherein the controller is operable to select the switches to sample the current such that positive and negative vector voltages of each phase of the motor are sampled wherein an average vector voltage of the motor is substantially zero.

18. The apparatus of claim 15, wherein the controller is operable to reset the switches to their previous states directly after a current sample has been obtained.

19. The apparatus of claim 15, wherein the switches are field effect transistors, and the controller is operable to open all of the switches until the next PWM cycle such that the switches act as rectifiers dumping current back to a power source during an overcurrent condition.

20. The apparatus of claim 15, wherein the controller is operable to switch the switches earlier within a PWM period during an overcurrent condition.

21. The apparatus of claim 15, wherein the controller is operable to switch the switches for each positive and negative voltage vector for each phase of the motor before exiting the damping mode, and wherein the controller is operable to switch the switches earlier within a PWM period during an overcurrent condition and later within a PWM period after an overcurrent condition.

* * * * *